Figure 1:
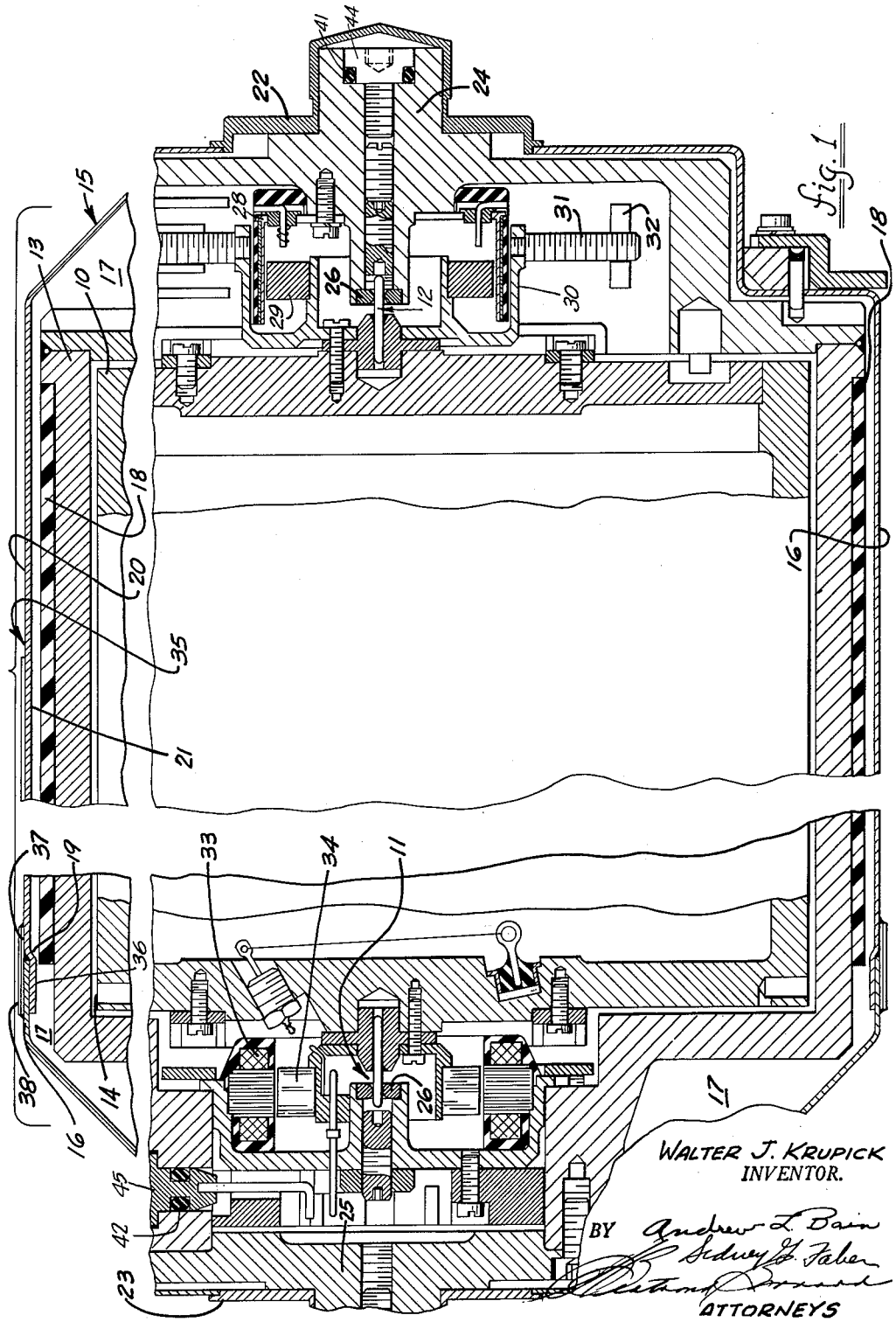

May 1, 1962   W. J. KRUPICK   3,031,892
GYROSCOPE FITTED WITH VACUUM CONTAINER
Filed March 1, 1960   3 Sheets-Sheet 1

WALTER J. KRUPICK
INVENTOR.

BY
ATTORNEYS

May 1, 1962 W. J. KRUPICK 3,031,892
GYROSCOPE FITTED WITH VACUUM CONTAINER
Filed March 1, 1960 3 Sheets-Sheet 3

WALTER J. KRUPICK
INVENTOR.

BY
ATTORNEYS

United States Patent Office 3,031,892
Patented May 1, 1962

3,031,892
GYROSCOPE FITTED WITH VACUUM CONTAINER
Walter J. Krupick, Franklin, N.J., assignor to General Precision, Inc., Little Falls, N.J., a corporation of New York
Filed Mar. 1, 1960, Ser. No. 12,133
9 Claims. (Cl. 74—5.5)

This invention generally relates to improvements in small precision gyros used for aircraft and the like, and more particularly to improvements directed toward reducing the size, weight, and cost of such gyros and their controls, as well as increasing their reliability.

Single axis fluid supported and damped gyros are widely used for many applications requiring extreme accuracy, and as presently manufactured they are precision devices made and assembled under the closest tolerances, temperature control and dust and dirt free conditions to insure the accurate fits and tolerances, and the physical characteristics essential for proper operation.

Along with the other cooperating parts, the special floating and damping fluid and the float, which is supported by the damping fluid, are essential elements of the gyro requiring careful selection and handling during the manufacture and testing of the gyro, as well as accurate and dependable regulation of its temperature when the gyro is in use to provide and maintain the delicate balance between density and viscosity needed to both float the gyro inner drum and provide damping of its movements in just the degree needed to meet operating requirements under a wide range of operating conditions.

It is also essential that the temperature across the entire surface of the float, and the fluid supporting it be maintained at substantially uniform levels at all times.

It is further essential that the gas contained in the gyro container be prevented from passing by the O-rings, located at various points within the outer jacket of the gyro.

To maintain and accurately regulate the temperature of the fluid despite wide variations in the ambient temperature, it is a common practice to wrap the gyro in resistance heating coils and provide an automatically operating regulating system for energizing the heating coils in such manner as to always maintain the temperature substantially constant. In its simplest form, a regulating system of this type necessarily includes a temperature sensing means together with an amplifier and controls, all being connected with the heating coils to regulate the flow of current to the heating coils, coordinated with the ambient temperature.

The magnitude of this problem becomes apparent when it is realized that in an inertial guidance system at least three such gyros are employed for stabilizing the inertial guidance platform alone, not to mention the additional gyros of this type that may be carried on the craft for performing other navigation and control functions. Since all of these gyros are located at different locations on the craft and accordingly subjected to different temperatures, it is customary for each to be provided with its own temperature regulating system.

According to the present invention, there is provided in addition to the conventional type of temperature control devices, an improved gyro structure for eliminating this problem. This improved structure generally speaking makes use of a passive heat control and regulating system in addition to the active heating coil system described above. More specifically, there is provided a specially costructed housing or outer jacket for enclosing the gyro structure and being so arranged as to thermally insulate the gyro fluid and related parts from exposure to changing ambient and operating temperatures.

At the same time, this passive heat stabilizing system provides heat conduction paths from within the gyro mechanism for the purpose of enabling the escape of heat being generated in the gyro rotor, bearings and other relatively moving parts, thereby to maintain and stabilize these parts at the desired thermal and operating condition. This is in addition to the conventional electrical heating coils, and the sensor mechanism used in conjunction therewith.

The primary purpose of the invention, is to reduce to a minimum the effects of external temperature variations, on the various parts of the gyro, and the flotation fluid used in conjunction therewith.

By insulating the interior of the gyro from the atmosphere, a relatively uniform gyro temperature is maintained at all times.

In order to maintain proper float balance, it is essential that substantially uniform temperatures be maintained around the float, and that the consistency and texture of the fluid be maintained substantially uniform at all times.

Any bubbles formed in the fluid interfere with the balance of the gyro. If any air or gas is released through the O-rings, or other parts of the seal apparatus into the fluid, it causes bubbles to form in the fluid. Air bubbles formed in the fluid due to gas or air tend to detrimentally affect the balance of the gyro.

It is essential in floated gyros that the float temperature be maintained at a substantially uniform level over its entire area.

This construction further minimizes or prevents entirely the passage of air or gas through the O-rings, located at various points on the gyro structure, from the inner elements of the gyro mechanism, to the inner surface of the jacket.

It is accordingly a principal object of the invention to provide a floated gyro construction having a passive heat control system for maintaining the temperature of the working parts of the gyro substantially constant despite changes in the ambient temperature and atmospheric conditions.

Another object is to provide a single axis rate integrating gyro of reduced complexity, that is less costly.

A still further object is to provide a single axis rate integrating gyro having greater dependability than prior gyros of this type.

Figure 2:
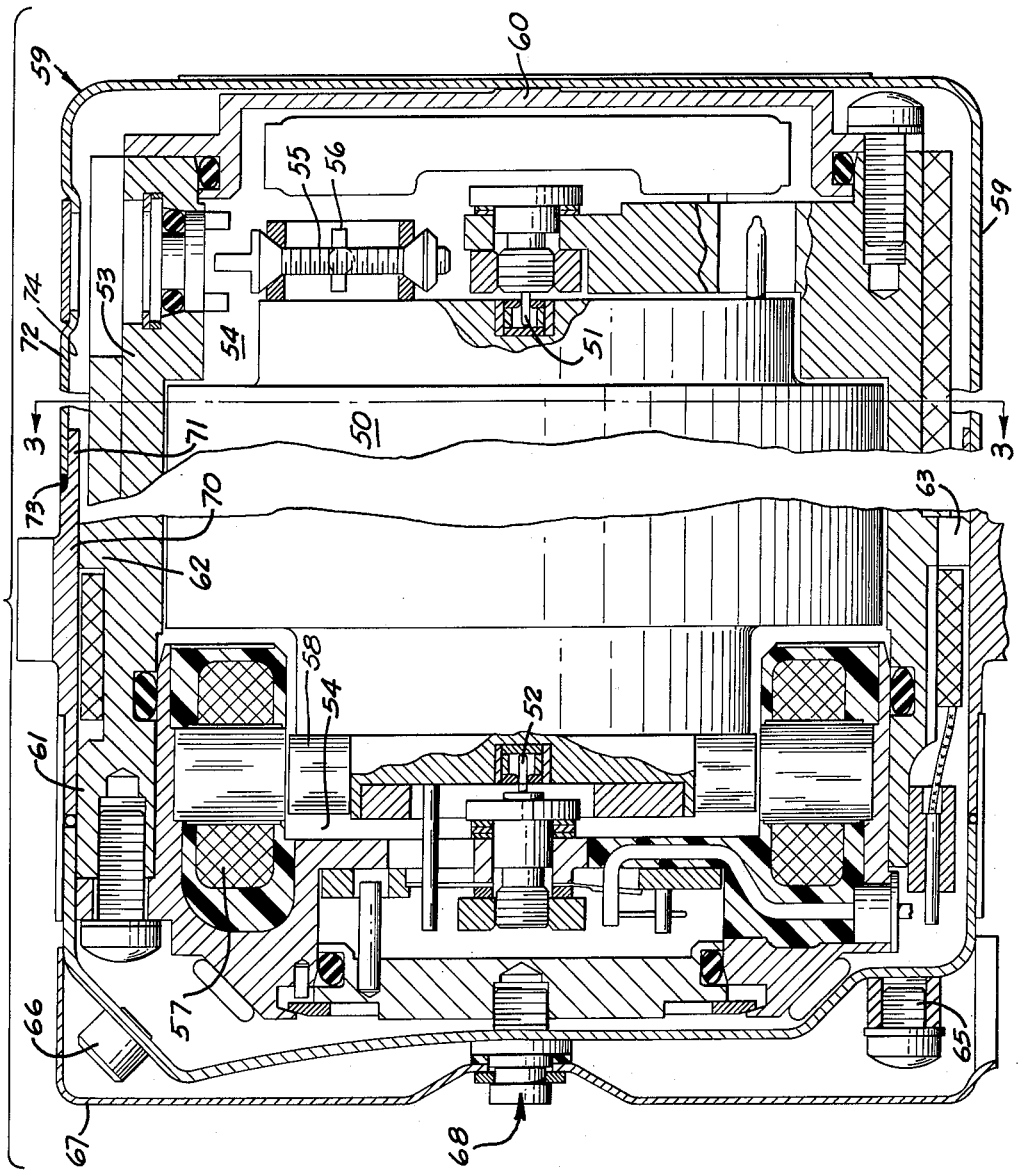
Figure 3:
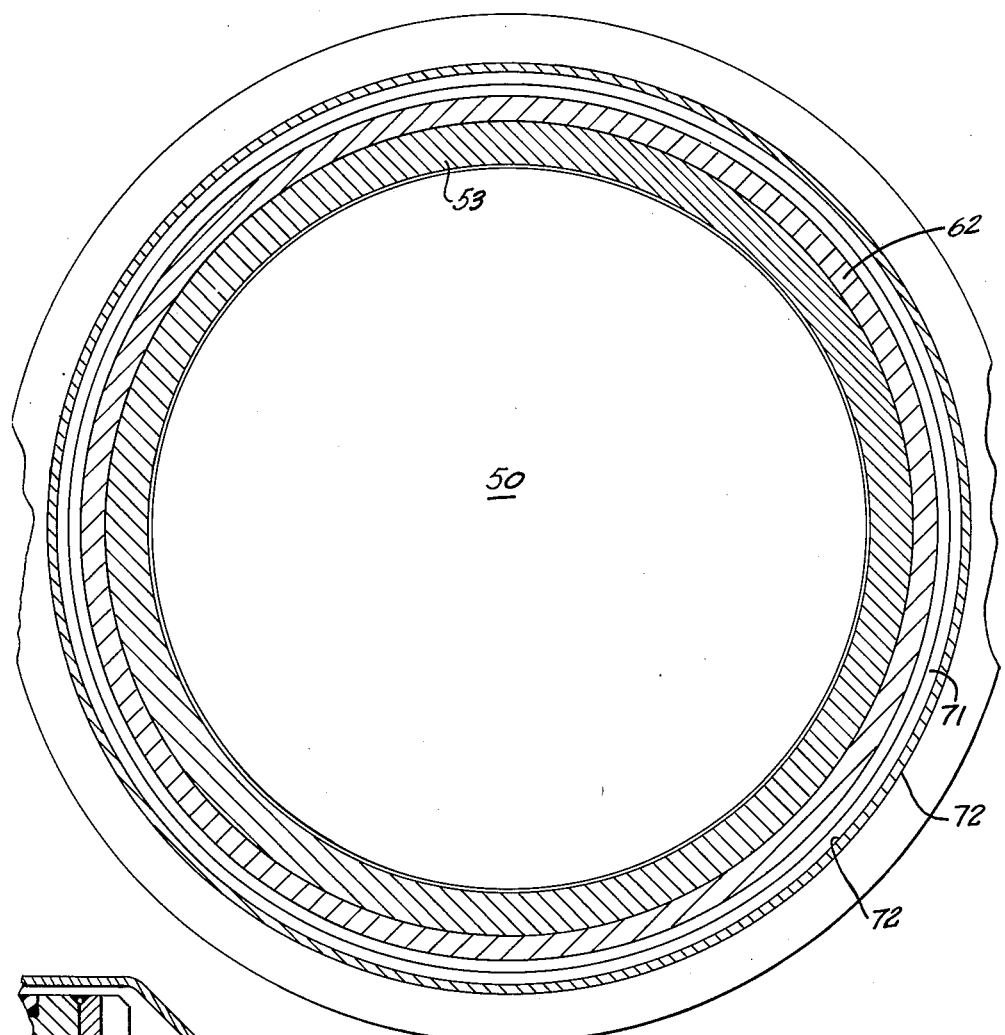
Figure 4:
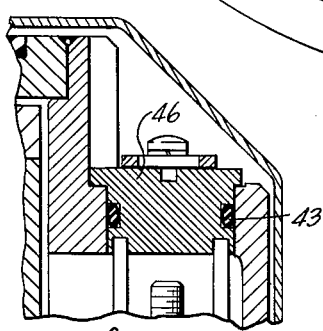

Other objects and many additional advantages will be more readily understood by those skilled in the art after a detailed consideration of the following specifications and drawings wherein:

FIGURE 1 is a longitudinal view in section illustrating one preferred embodiment of the invention, FIGURE 2 is a longitudinal section similar to FIGURE 1 illustrating an alternative gyro structure, FIGURE 3 is a cross-section through the gyro structure, and the vacuum container shown in FIGURE 2, taken in the line 3—3 of FIGURE 2, FIGURE 4 is a fragmentary view illustrating constructional details of the upper right-hand portion of the embodiment of FIG. 1.

Referring now to the drawings, there is shown in FIGURE 1 a single axis rate integrating gyro having an inner sealed drum 10 which is preferably cylindrically shaped. The inner drum 10 is adapted to contain a rapidly spinning gyro rotor (not shown) mounted to rotate about an axis transverse to the longitudinal axis of the drum. The inner drum 10, in turn, is pivotally supported by bearings generally indicated at 11 and 12, for rotative movement about its longitudinal axis within a hermetically sealed container 13, which as shown, fully encloses the drum 10 but has walls spaced therefrom to permit such rotative movement of the drum.

Within the container 13, there is provided a special fluid 14 that fills all spaces between the two members to fully immerse the drum 10. As known in the art, the density of the fluid 14 is selected to provide a buoyant force distributed about the drum which is substantially equal to the weight of the drum, and the drum 10 is carefully designed, manufactured, and adjusted so that its center of mass and center of buoyancy are such as to neutrally float the drum 10 in the fluid 14 and provide a minimum of unbalanced forces and torques on the bearings 11 and 12. For this reason, the bearings 11 and 12 may be quite delicate and precise and provide minimum friction impeding rotation of the drum.

As is also customary in this type of gyro, the fluid is selected to possess a desired degree of viscosity, whereby rotative movements of the drum 10 within the container 13 are opposed by the fluid damping effect to provide an ultimate displacement between drum 10 and container 13 proportional to a rate integrating function.

However, should the temperature of the fluid 14 vary perceptively in response to changes in the ambient temperature exterior of the gyro, the delicate balance between the weight of the drum 10 and the buoyant support of the fluid would be destroyed thereby unbalancing the forces on the bearings 11 and 12 and changing the operating characteristics of the gyro. This temperature change in the fluid 14 also would vary the fluid viscosity, bringing about an undesirable change in the damping of drum movements and consequently further deviating from the desired operating characteristics. For these reasons, it is essential that the temperature of the fluid be stabilized and maintained closely within a predetermined narrow range to insure proper functioning of the gyro mechanism.

In order to prevent the escape of flotation fluid from the flotation chamber, and to further prevent the passage of gas or air into the flotation fluid, a plurality of O-rings, or other type of seal means is provided, as hereinafter described ni greater detail.

As most of these O-rings are surrounded by a vacuum chamber, the passage of gas, or air into the flotation area is eliminated. While some fluid may leak through the O-rings, the extent of this leakage is inconsequential.

However, with a vacuum surrounding the O-rings, no gas, or air can leak through the O-rings to the flotation chamber. This is of vital importance, as any air or gas bubbles in the flotation fluid tend to disturb the balance of the gyro.

To provide this stabilization according to the present invention, there is provided means for substantially preventing either the conduction or radiation of heat to or from the gyro fluid 14 despite changes in the ambient temperature exterior of the gyro. These means preferably comprise an outer hermetically sealed jacket member 15 for completely enclosing the gyro and having circumferential side walls 16 being spaced from the walls of the container to provide a zone or area 17 between the gyro container and the outer jacket. This zone or area 17 between the container 13 and outer jacket 15 is evacuated to a low order vacuum thereby to substantially prevent the conduction of heat between the two members. If desired, there may also be included a sheath of heat insulating material 18 forming a wrapping about the outside of the gyro cylinder and making contact at one or more positions such as 19, with the outer jacket 15 to provide a support for the outer jacket along its longitudinal wall.

While the outer jacket prevents the transfer of heat from the atmosphere to the gyro, or from the gyro to the outer atmosphere, the conventional type of heating coils may be provided around the outer surface of the container 13, to heat the gyro mechanism. In addition to the heating coils, a heat sensor may be provided to regulate the heat generated by the heating coils in order to maintain the operating temperature of the gyro mechanism at relatively uniform levels.

In order to facilitate fitting and assembly of the outer jacket 15, to the gyro container, the outer jacket may be made in two sections. The thin walled right-hand section 35, which has a stepped down annular flange section 36 integral therewith, extends along substantially the entire length of the outer jacket 15, the diameter of the stepped down flange section being slightly less than the inner diameter of the circular wall of the relatively short left-hand section, the circular wall of the left-hand section being telescoped over and fitted to the annular flange 36 of the right-hand section.

The junction ring between the two jacket sections is soldered at 37, or otherwise heat sealed to provide a positive moisture proof and vacuum seal between the two sections.

In addition to the solder ring 37, a flat band 38 of solder is formed at the junction between the two sections of the jacket, the flat band overlapping the circumferential outer wall of each section of the jacket.

The relation of the sections of the outer jacket to the container, the relative length of the outer jacket sections, and the relation of the annular flange 36, to the respective jacket sections, may be varied to suit the requirements of a particular application.

By blanketing the outer longitudinal walls of the gyro container within a low order vacuum, as described, the conduction of heat from the gyro fluid 14 outwardly, or the reverse, is substantially prevented and the temperature of the fluid is consequently stabilized against change due to the conduction of heat through the walls of the jacket 15 and the container 13.

In order to prevent the escape of flotation fluid 14 from the flotation chamber, a plurality of O-rings 41, 42, 43, or other types of seal means may be provided, the O-rings fitting into grooves or counter bores in the mating elements.

One pair of O-rings 41, is fitted to counterbores in the cylindrical end wall portions 24, 25 of the container, the stepped heads 44, of the screws clamping the O-rings against the bottom of the respective counterbores.

A second O-ring 42, is fitted to a circular groove surrounding a headed plug 45, which is inserted through an opening at the left-hand end of the container 13.

A similar O-ring 43, as shown in FIGURE 4, is inserted into an annular groove surrounding the body of a headed plug 46, which is inserted into an opening at the right-hand end of the container 13.

As both the headed plugs 45, 46 lead into the vacuum area 17 surrounding the container 13, the O-rings 42, 43 serve to prevent the passage of gas, or air into the flotation fluid 14, as both plugs lead into a vacuum. This prevents the formation of air or gas bubbles within the flotation fluid, thereby avoiding any interference with the balance of the gyro, due to the presence of gas bubbles in the flotation fluid.

To prevent heat transfer to or from the fluid by the process of heat radiation, the outer surface 20 of the jacket 15 is polished or otherwise finished to provide a heat reflecting surface. Since a heat reflector is also a poor heat radiator, this outer reflecting surface 20 not only prevents the radiation of heat from outside the gyro structure to the fluid but also considerably reduces the escape of heat by radiation from the fluid should the temperature outside the gyro fall below the stabilized temperature of the fluid 14.

To further reduce the loss of heat by radiation from the fluid, the inside surface 21 of the jacket 15 may also be polished or otherwise finished as a heat radiation surface, thereby to reflect backwardly into the jacket some of the heat rays being radiated from the gyro.

However, to effectively stabilize the temperature of the fluid 14, it is also necessary that the heat being generated within the gyro structure by reason of the wind losses from the spinning rotor (not shown) and the heat being generated by friction in the bearings be permitted to escape from the gyro container. Otherwise this internally generated heat would be gradually accumulated within the gyro structure and would ultimately increase the temperature of the fluid. To provide for this escape of heat, the end walls 22 and 23 which are attached to the ends of the outer jacket 15 directly make contact with the end wall structure 24 and 25 of the gyro container 13, thereby enabling the conduction of heat being generated within the gyro, the heat passing outwardly through the container and through the jacket and walls 22 and 23.

It is to be particularly noted that the preferred construction of the gyro inner drum 10 and the container 13 is such that the bearings 11 and 12 supporting the drum are supported in jewels 26 mounted in the container end walls 24 and 25 respectively, and consequently proximate to the portions 22 and 23 of the outer jacket 15 that contact these end walls. Heat being generated within the inner drum 10 and in the bearings is therefore conducted through the pin bearings 11 and 12 to the container end wall portions 24 and 25, outwardly through the end walls 22 and 23 of the outer jacket. Some heat transfer does, of course, occur to the fluid 14 by conduction through the same end wall structure of the container 13. However, the vacuum insulated and reflective circumferential wall structure of the container 13 provides a considerably greater enclosing area about the fluid 14 and consequently the arrangement described provides a minimum number of paths for the transfer of heat to and from the fluid 14.

The remaining portions of the gyro shown in FIGURE 1 comprise a torque motor structure for rotatively displacing the gyro about its bearings 11 and 12 responsively to an electrical signal, which torque motor is housed within the right-hand end portion of the container 13. Specifically, the torque motor includes a cylindrically formed stator 28 fastened to the inside of the container end wall 24 and being coaxially positioned with respect to pin bearing 12. A generally cylindrically shaped rotor 29 suitably supported on a frame structure 30 carried by the drum 10, is positioned inside the stator 28, and when energized by an electrical signal provides an electromagnetic torque to turn the inner drum 10 about its bearings 11 and 12.

Also supported on the frame 30 connected to the right-hand end of drum 10 are a pair of outstanding balancing screws 31 having nuts 32 which may be threadably adjusted along the length of the screws 31 in directions toward and away from the axis of rotation of the drum 10. This mechanism permits fine adjustment and balancing of the drum 10 in the fluid to obtain the neutral suspension desired.

Within the container 13 and positioned near the left-hand side of the drum 10 and near the left-hand end wall structure 25 of the container 13, there is provided a pick-off including a stator winding 33 suitably supported by the container 13 and an armature 34 comprising a plurality of poles positioned coaxially within the stator windings 33, the armature being attached to the inner drum 10, and rotating therewith. As known in the art, such a pickoff produces an electrical signal having a magnitude proportional to the relative rotative displacement between the drum 10 and the container 13 and having a polarity indicating the direction of such displacement. Since the torque motor, pick-off, drum adjusting means and other features of the single axis gyro construction of FIGURE 1, are generally known to those skilled in the art, further details thereof are not considered necessary to an understanding of the present invention and may be found in Patent 2,856,777 of Walter J. Krupick, assigned to the same assignee.

In FIGURE 2, there is shown an alternative single axis floated gyro construction embodying the temperature stabilizing means of the present invention.

As in FIGURE 1, there is shown a hollow sealed inner drum 50 adapted to contain a spinning gyro rotor inside thereof (not shown) and the drum 50 is rotatively supported on pin and jewel bearings 51 and 52 for rotative displacement about its longitudinal axis within a sealed outer container 53.

Like the gyro of FIGURE 1, the container 53 houses a fluid 54 within the spaces between the drum 50 and the container 53 which immerses the drum 50 and neutrally suspends the drum therein.

A plurality of heating coils, similar to those hereinbefore described, may be provided around the outer circumference of the container 53 shown in FIGURE 2, to heat the interior of the container. In addition to the heating coils, a heat sensor may be provided to regulate the supply of current to the heating coils, thereby maintaining the required operating temperature in the interior of the container 53, thus assisting in maintaining the required operating temperature of the flotation fluid within the container 53.

To adjust the center of gravity of the drum, there is provided an adjusting screw 55 and nut 56 functioning in a manner similar to the elements of FIGURE 1.

To detect relative displacement between the drum 50 and the container 53, there is provided a pick-off including a stator winding 57 supported by the container 53 and a rotor pole structure 58 supported by and rotatable with the drum 50.

Enclosing the complete gyro structure there is provided a hermetically sealed outer jacket 59 which may be formed of thin metallic material. The outer jacket 59 is made larger than the outer dimensions of the gyro container 53 and its walls are therefore spaced from the circumferential outer walls of the container 53. To support the jacket 59, the circumferential and end walls of the outside of the container 53 are provided with raised portions such as 60, 61, 62 and 63 which contact the inner surfaces of the corresponding walls of the outer jacket 59 at spaced positions. However, these engaging positions provide a minimum number of heat conducting paths as compared to the wide areas of the container 53 and the jacket 59 that are spaced apart.

To prevent any substantial heat conduction between the container 53 and the jacket 59, the spaced areas between these members are evacuated to a low order vacuum as in FIGURE 1. This evacuation of air may be made through the hollow tubes 65 and 66 which are thereafter suitably capped and sealed. For protecting the evacuating tubes 65 and 66 against breakage and for otherwise providing a smooth outer surface over the gyro mechanism, a large end wall cap 67 is fastened about the left-hand end wall of the outer jacket 59, thereby enclosing the tubes 65 and 66. This end wall cap 67 is also connected at its central position to the left-hand wall of the sealed jacket 59 by a suitable shock-proof connecting means 68 thereby to provide the rigidity needed.

In order to facilitate the fitting and assembly of the outer jacket 59, to the gyro container 53, the outer jacket may be made in two sections. The left-hand section 70 of the jacket has a stepped annular flange 71 of circular cross-section integral therewith, the diameter of the stepped down pilot section being slightly less than the circumferential wall of the cupped right-hand section 72 of the jacket, the circumferential wall of the right-hand section being slidably fitted to the pilot flange 71 of the left-hand section.

The circumferential junction between the two jacket sections 70, 72, is soldered at 73, or otherwise heat sealed to provide a positive moisture proof and vacuum seal between the two sections 70, 72 of the outer jacket.

For stabilizing the temperature of the fluid 54 against heat transfer due to radiation, the outer surface of jacket 59 may be polished or otherwise treated or coated to reflect the heat rays. This surface also serves as a poor radiator in transmitting heat from the fluid. In addition, as discussed above, it may be desired to polish or otherwise form the inner surface 74 of the jacket 59 as a reflector to prevent heat rays from the interior of the container being radiated to a lower temperature ambient condition externally of the jacket 59.

What is claimed is:

1. In a precision gyro, an inner drum containing a gyro rotor rotatable at high speed about a given spin axis, a sealed container forming an enclosure about the drum and being spaced from the drum, pivot means supporting said drum for movement about an axis transverse to said spin axis, and a fluid within the container and immersing said drum to provide buoyant support therefor, as well as providing a viscous restraining force opposing movement about said transverse axis, a hermetically sealed outer jacket enclosing said container and engaging the ends of the container but being spaced from its circumferential walls, means permitting the evacuation of the space between the container and the jacket to a low order vacuum, and said jacket being polished to provide a heat reflecting outer surface at those areas of the container that are spaced from the jacket.

2. In a precision gyro, a drum, a gyro rotor rotatably supported within the drum, a container enclosing the drum and having circumferential end walls spaced from the drum, means pivotally supporting the drum for rotating movement within the container, and a fluid within the container and immersing the drum, a hermetically sealed outer jacket about the container and having end walls engaging the end walls of the container and circumferential walls that are spaced from the circumferential walls of the container, means enabling the evacuation of the space between the outer jacket and the container to a low order vacuum, the circumferential outer surface being polished to a reflecting surface, to reflect heat, whereby heat conduction and heat radiation between the spaced areas of the outer jacket and the container is substantially prevented thereby to stabilize the temperature of the fluid, whereas heat generated by the gyro rotor within the drum is conducted outwardly through the end walls of the outer jacket.

3. In the gyro of claim 2, the inner surface of the circumferential outer walls of the outer jacket being polished to a heat reflecting surface thereby to substantially prevent the radiation of heat outwardly from the container.

4. In a single axis floated gyro, a sealed container housing containing a fluid and means pivotally supporting a gyro rotor structure within the container and immersed in the fluid for movement about an axis transverse to the rotor spin axis, a hermetically sealed outer jacket of heat conducting material enclosing the container and having circumferential walls spaced from the circumferential walls of the container and end wall members engaging the end walls of the container, means permitting the evacuation of the space between the outer jacket and the container to a low order vacuum, and said outer jacket being polished to an outer heat reflective surface thereby to stabilize the temperature of the fluid within the container.

5. In the gyro of claim 4, the inner surface of the outer jacket surrounding the circumferential outer surface of the container also being provided with a heat reflecting surface thereby to prevent radiation of heat outwardly from the container.

6. In a single axis floated gyro, a container housing a fluid, a hollow drum located within the container and being pivotally mounted for rotational movement within the container, said drum enclosing a gyro rotor pivotally supported therein about an axis transverse to the drum pivot axis, a hermetically sealed outer jacket of heat conducting material fitted about said container and engaging the end wall portions of the container proximate the pivotal supporting means for the drum to provide a heat conducting path from the pivotal supporting means and through the container and the outer jacket, and said outer jacket engaging said container cylinder at only a minimum of other positions, thereby to provide spaced areas between the container cylinder and the outer jacket, means permitting the evacuation of said spaced areas to a low order vacuum to prevent heat conduction between the container cylinder and the outer jacket at such areas, and said outer jacket being provided with a heat reflecting outer surface thereby to minimize radiation of heat from said container cylinder.

7. In the gyro of claim 6, the inner surface of said outer jacket also being polished to reflect heat thereby to prevent radiation of heat outwardly from the container.

8. In the gyro of claim 6, the container having a pair of end walls at both longitudinal ends thereof, the outer jacket having a pair of ends walls co-axially aligned with the end walls of the container, the end walls of the outer jacket being in engagement with the end walls of the container to conduct the heat generated by the gyro within the container through the outer surface of the outer jacket.

9. In a precision gyro, a drum for housing gyro rotor, a hollow substantially cylindrical container enclosing the drum and having circumferential end walls spaced from the drum, a pair of jewel bearings pivotally supporting the drum for rotative movement within the container, and a fluid within the container and immersing the drum, means surrounding the container adapted to heat the container, a hermetically sealed substantially cylindrical outer jacket about the container and having end walls engaging the end walls of the container and circumferential walls that are spaced from the circumferential walls of the container, tubular means enabling the evacuation of the space betweeen the outer jacket and the container to a low order vacuum, and means sealing the tubular evacuation means, the circumferential outer surface of the jacket being polished to a reflecting surface, to reflect heat, whereby heat conduction and heat radiation between the spaced areas of the outer jacket and the container is substantially prevented thereby to stabilize the temperature of the fluid, whereas heat generated by the gyro rotor within the drum is conducted outwardly through the end walls of the outer jacket.

References Cited in the file of this patent

UNITED STATES PATENTS

| | | |
|---|---|---|
| 2,260,396 | Otto | Oct. 28, 1941 |
| 2,585,024 | Lundberg | Feb. 12, 1952 |
| 2,825,789 | Scott | Mar. 4, 1958 |
| 2,856,777 | Krupick | Oct. 21, 1958 |
| 2,929,250 | Passarelli et al. | Mar. 22, 1960 |